United States Patent Office 3,763,139
Patented Oct. 2, 1973

3,763,139
MODIFIED LIGNIN SURFACTANTS
Sten I. Falkehag, Mount Pleasant, S.C., assignor to
Westvaco Corporation, New York, N.Y.
No Drawing. Filed May 25, 1972, Ser. No. 256,779
Int. Cl. C07g 1/00
U.S. Cl. 260—124 R                10 Claims

ABSTRACT OF THE DISCLOSURE

The improved lignin surfactant of this invention is a lignin modified by reaction with up to 20 moles, preferably from 2 to 10 moles, per 1000 grams of lignin, of an agent of the type $X(CHR)_m(CH_2)_nY$, wherein X is a halogen, an activated double bond, such as in acrolein, an epoxide ring or a halohydrin, Y is a property group such as sulfonate, phosphonate or hydroxyl, R is a property group, such as hydroxyl, mercaptan, amine or hydrogen, and $n$ and $m$ are integers from 0 to 5, and $m$ and $n$ together are at least 1, to at least partially block the acidic hydroxyl groups of the lignin.

BACKGROUND OF THE INVENTION

(1) Field of the invention

This invention relates to modified lignin surfactants. More specifically, this invention relates to lignin surfactants that have been modified by blocking the phenolic hydroxyl group.

(2) The prior art

Lignin and sulfonated lignin materials derived from forest products have found widespread use as surfactants, in particular as dispersants and coagulants. Also lignin materials in one form or another are used as drilling mud additives, asphalt emulsifiers, resin extenders and dye dispersants.

Numerous reactants are available to modify lignins in order to improve certain properties, for example, dispersing ability, or to inhibit a property that is undesirable for certain uses, for instance the undesirable dark color of lignin. By way of illustration of methods of modifying lignins the following patents are cited. U.S. Pat. 3,600,308 to G. G. Allen describes reacting lignin with a variety of chemical agents to increase molecular weight for use as coagulants. U.S. Pat. 3,546,199 to D. T. Christian et al. describes a process for producing polyols from lignin. U.S. Pat. 2,854,444 to L. T. Monson et al. describes a process for oxyalkylating ligin sulfonic acid for use as wetting agents and dispersants. The art cited is meant to show the state of the art and is not intended to be all inclusive of lignin modifications.

Although the invention herein described is to new lignin products, it has been found particularly useful as a dispersant for disperse and vat dyes, as cement additives, as metal complexing agents and as a dispersant in general.

It is therefore the general object of this invention to providea novel alkali lignin or sulfonated lignin surfactant characterized by having the phenolic hydroxyl group blocked. Another object of this invention is to provide a dyestuff composition containing a modified alkali or sulfonated lignin having a blocked phenolic hydroxyl group as a dispersing agent.

Further objects, features and advantages of this invention will be evident from the following detailed description of the invention.

SUMMARY OF THE INVENTION

Lignin adducts comprising the reaction product of an alkali lignin or sulfonated lignin with up to 20 moles, preferably from 2 to 10 moles per 1000 grams of lignin, of an agent of the type $X(CHR)_m(CH_2)_nY$, wherein X is a hologen, an activated double bond, such as in acrolein, an epoxide ring or a halohydrin, Y is a property group such as sulfonate, phosphonate or hydroxyl, R is another property group such as hydroxyl, mercaptan, amine, or hydrogen, and $n$ and $m$ are integers from 0 to 5, and $m$ and $n$ together are at least 1 to at least partially block the acidic hydroxyl group of the lignin. These blocked lignins are useful as surfactants, particularly as dispersants in dyestuff compositions.

DETAILED DESCRIPTION OF THE INVENTION

The lignins employed to make the adducts of this invention include alkali lignins from the kraft pulping process and lignins derived from other alkaline processes such as the soda or modified soda processes, sulfonated lignins, such as sulfite lignins from acid and neutral processes and sulfonated alkali lignins. One of the main sources of lignin is the residual pulping liquors of the pulp industry where lignocellulosic materials such as wood, straw, corn stalks, bagasse, and the like are processed to separate the cellulose or pulp from the lignin. For example, the black liquor obtained from the kraft, soda and other alkali processes is not recovered as a sulfonated product but may easily be sulfonated, if desired, by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used.

By the term "sulfonated lignin," it is meant any lignin containing at least an effective amount of sulfonate groups to solubilize the lignin in water at neutral or acid conditions. Any of the sulfonated lignins may contain up to one-half of the other materials, such as carbohydrates, phenols and other organic and inorganic compounds. The presence of these other materials results in larger consumption of the reactants used to form the adduct; therefore some purification of the lignin starting materials is often desirable. The nonsulfonated lignin materials may be removed by various known methods. Since the chemical structure of lignin varies according to its source and treatment, the following will be used herein to represent both alkali lignin and sulfonated lignin from whatever source. The degree of sulfonation present in the lignin is not a controlling factor in making the adduct but may be used to tailor the adduct to have desired characteristics.

The lignin materials are reacted with up to 20 moles, preferably from 2 to 10 moles, per 1000 grams of lignin, of an agent of the type $X(CHR)_m(CH_2)_nY$, wherein X is a halogen, an activated double bond, such as in acrolein, an epoxide ring or a halohydrin, Y is a property group such as sulfonate, phosphonate, or hydroxyl, R is another property group such as hydroxyl, mercaptan, amine or hydrogen, and $n$ and $m$ are integers from 0 to 5 with $n$ and $m$ together being at least 1, to at least partially block the acidic hydroxyl groups of the lignin. When the starting lignin is a sulfonated lignin, improved dispersing ability begins with just a trace of adduct formation, however, it is preferable to add at least 1 mole of blocking agent. On the other hand, adducts made with alkali lignin need additional blocking, usually at least 1 mole of blocking agent per 100 grams of lignin to become water soluble. The reaction of lignin with the blocking agent in its salt form may be exemplified wherein the adduct is shown having 1 as an integer from 0 to 2 depending upon the reactive group X;

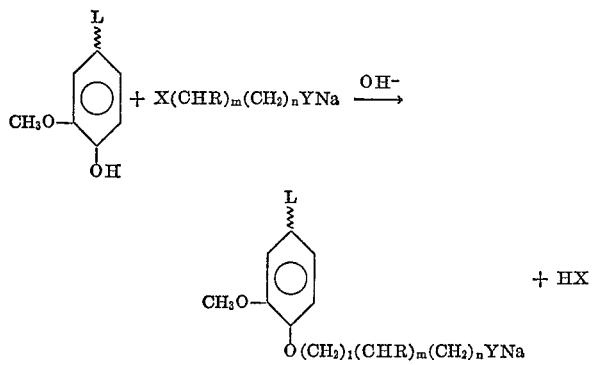

The reaction of the lignin with any of the reactants serves primarily to block the acidic hydroxyl groups of the lignin. Depending upon the starting lignin material, whether residual pulping liquors or a refined product, the phenolic hydroxyl content of the lignin can be reduced to substantially zero. The adduct formation, at least to some extent, serves to block other ionizable hydroxyl groups, such as carboxyl and aliphatic hydroxyls. It has been found that by blocking the hydroxyl groups in lignin with one of the agents described herein it is possible to reduce the dark reddish-brown color by 10% or more.

Examples of the blocking agents contemplated with the type exemplified by $X(CH_2R)_m(CH_2)_nY$, when $m$ is 0, include, for example, chloromethanesulfonate, chloromethanephosphonate, 2-chloroethanol, 2-bromoethanol and acrolein, among others. When $m$ is 1 or more, blocking agents include, for example, 1-chloro-2-hydroxyethane phosphonate and acrylamide. When X is a halohydrin specific blocking agents include, for example, 3-chloro-2-hydroxypropane phosphonate and 3-chloro-1, 2 dihydroxypropane when Y is a phosphonate or hydroxyl respectively, R is a hydrogen, $m$ is 1 and $n$ is 0.

The blocked lignins are made by simply dissolving the lignin in water or alkali and intermixing a given amount of blocking agent and reacting at a temperature between about 0° C. and 200° C. with the time depending upon the temperature used and the degree of blocking desired. The blocked lignin is allowed to cool and then dried. A catalyst, such as sodium hydroxide, may be used if desired but is not necessary.

Blocking the phenolic hydroxyl of lignin with chloromethanesulfonate is highly effective when applied to the phenolic hydroxyl in dry form. It appears that the reaction takes place best at temperatures between 160–180° C. At lower temperatures and in the presence of water the degree of reaction decreases dramatically. Good results were also obtained when lignin was phosphomethylated with chloromethanephosphonate, a chemical commercially available as an 85% aqueous solution. The phosphomethylation of alkali lignin gives products soluble at a pH lower than 1 by reacting 3 moles of chloromethanephosphonate per 1000 grams of lignin with the dry alkaline form of lignin at a temperature of 160° C. However, phosphomethylation already takes place at temperatures down to 100° C. to a considerable extent (even during spray-drying) materials with a precipitation point of about pH 1.85 (at 2% concentration) are produced.

When reacting in a water solution the results are not as good as those obtained from the dry reaction probably because of hydrolysis of the chloromethanephosphonate and chloromethanesulfonate at the higher temperatures. The sulfomethylation was found to be as complete as phosphomethylation at temperatures above 160° C. but somewhat less complete at lower temperatures.

The surfactants of this invention are particularly useful as dispersants for disperse dyes or vat dyes in either the dry or liquid form. The blocked sulfonated lignins may be added to the dye cake before, during or after grinding. For most dyeing applications and adduct having from 3 to 6 moles of reactant per 1000 grams of lignin starting material is used. It is generally preferred to add the surfactant prior to grinding so that it will be thoroughly mixed and aid in particle size reduction. The amount of blocked sulfonated lignin dispersants added to a dye will vary widely, depending upon the particular dye cake, the material to be dyed and the effect desired. Amounts up to 75% of the sulfonated lignin dispersant, based upon the weight of dried disperse or vat dye formation may be used. The most important factor in determining the proper amount of lignin surfactant to be used in making up the dyestuff is the particular dye cake used. Generally this amount will vary from dye to dye.

Dyestuff compositions comprise, for the most part, a dye cake, i.e., disperse dyes and vat dyes, and a dispersant. These dyestuff compositions are widely used to color both natural and synthetic fibers. The dye dispersants that may be used to disperse the dye cake vary widely in method of manufacture and source. In the dyestuff composition the dispersant serves three basic functions. It assists in reducing the dye particle to a fine size, it maintains a dispersing medium and it is used as an inexpensive diluent. Generally, dye dispersants are of two major types, one of those being sulfonated lignins from the wood pulping industry via the sulfite or kraft process. The disadvantages of sulfonated lignins include fiber staining, reduction of diazo-type dyes, dark brown color and a tendency to stabilize foams.

Fiber staining by the lignin occurs mainly on cellulosic and nitrogenous fibers such as cotton, nylon and wool; polyester fibers are also stained but to a lesser extent. A second disadvantage of sulfonated lignin dispersants has been that when dyeing with diazo-type dyes under high temperature and pressure dyeing processes, the oxidizable lignin structures tend to reduce the diazo dye linkage. Another disadvantage, the brown color, is psychological. Lastly, foam stabilization properties are troublesome for several reasons.

The advantages that water soluble lignin dispersants possess over other dispersants include the ability to impart better heat stability to the dye dispersion, and to disperse with equal effectiveness. Another advantage of a water-soluble lignin dispersant is that it tends to act as a dye retarder. Some dyes have a tendency to start dyeing at very low temperatures. Dyers prefer colors to dye a fiber at a steady rate proportional to temperature increase. If the color dyes too rapidly, the goods take on a streaky appearance; and creases in the material dye more rapidly than the face of the cloth.

As stated earlier, these modified water-soluble lignins are particularly useful as dispersants, as cement additives, and as metal complexing agents.

The practice of this invention may clearly be seen in the following examples.

EXAMPLE 1

Sulfomethylation of alkali lignin in dry state

To 38.7 ml. of water 100 grams of alkali lignin was added with stirring. Under a nitrogen blanket 32 grams of (50%) NaOH (4 moles/1000 grams lignin) and 45.7 grams $ClCH_2SO_3Na$ (3 moles/1000 grams lignin) was added at room temperature. Then the material was freeze-dried. Five grams of this dry material was placed in a 50 ml. three neck, round bottom flask, equipped with a condenser, stirrer and an inlet for $N_2$ and then heated to various temperatures. After 5 hours of stirring, the material was allowed to cool to room temperature. 0.5 gram of each sample was dissolved in 25 ml. of water, and HCl (0.5 N) was added until precipitation started to occur.

| Temp. (° C.): | pH after reaction | Precipitation point (pH) |
|---|---|---|
| 100 | 11.55 | 5.8 |
| 120 | 11.05 | 4.5 |
| 140 | 10.50 | 2.8 |
| 160 | 10.35 | [1] 1.0 |
| 180 | 10.65 | [1] 1.0 |

[1] Still in solution.

EXAMPLE 2

Sulfomethylation of alkali lignin in aqueous state

To 387 ml. of water 100 grams of alkali lignin was added with stirring. Under a nitrogen blanket 32 grams of (50%) NaOH and 45.7 grams $ClCH_2SO_3Na$ were added at room temperature. 20 ml. of this solution was placed in an autoclave and heated to temperature in an oil bath. After 5 hours of reaction time with occasional shakings, the material was allowed to cool to room temperature. 5 ml. of each solution was diluted with 25 ml. of water and HCl (0.5 N) was added until precipitation started to occur.

| Temp. (° C.): | pH after reaction | Precipitation point (pH) |
|---|---|---|
| 100 | 11.55 | 6.9 |
| 120 | 11.35 | 5.8 |
| 140 | 11.35 | 5.9 |
| 160 | 11.30/11.1 | 5.7/5.5 |
| 180 | 10.95 | 5.5 |

EXAMPLE 3

Phosphomethylation of alkali lignin in dry state

To 100 grams of alkali lignin was added 32 grams of a 50% NaOH solution in 387 ml. of water with stirring under a $N_2$-atmosphere. After addition of 46 grams $ClCH_2PO_3H_2$ [3 moles/1000 grams of lignin] (added as a 85% aqueous solution) and 48 grams 50% NaOH. The mixture was freeze dried. Five grams of this dry lignin sample was placed in a 50 ml. three neck round bottom flask. The material was heated in an oil bath and 1 gram portions were withdrawn after 15, 30, 60, 120 and 300 minutes. The products were each dissolved in water (0.5 gram of product in 25 ml. of water) and the precipitation point was determined with 0.5 N HCl.

| Reaction time (min.) | pH after reaction | Precipitation point (pH) |
|---|---|---|
| 100° C.: | | |
| 0 | 11.60 | 6.50 |
| 15 | 11.00 | 2.55 |
| 30 | 10.90 | 2.30 |
| 60 | 10.85 | 2.15 |
| 120 | 10.80 | 2.10 |
| 300 | 11.00 | 1.85 |
| 140° C.: | | |
| 0 | 11.60 | 6.50 |
| 15 | 10.50 | 1.85 |
| 30 | 10.45 | 1.75 |
| 60 | 10.20 | 1.70 |
| 120 | 10.00 | 1.25 |
| 300 | 10.15 | 1.15 |
| 180° C.: | | |
| 0 | 11.60 | 6.50 |
| 15 | 10.80 | 1.60 |
| 30 | 10.75 | 1.40 |
| 60 | 10.40 | 1.20 |
| 120 | 10.30 | 1.10 |
| 300 | 10.00 | [1] 1.00 |

[1] Still in solution.

EXAMPLE 4

Phosphomethylation of alkali lignin in aqueous state 100 grams of alkali lignin was added with stirring to 387 ml. of water. 32 grams of NaOH (50%), 46 g. of $ClCH_2PO_3H_2$ [3 moles/1000 grams of lignin] (85%) 48 g. NaOH (50%) were added at room temperature under an $N_2$ atmosphere. 20 ml. of this solution was placed in an autoclave and heated to temperature in an oil bath. After 5 hours of reaction time with occasional shakings the material was allowed to cool to room temperature. 5 ml. of each solution was diluted with 25 ml. of water, and HCl (0.5 N) was added until precipitation started to occur.

| Temp. (° C.): | pH after reaction | Precipitation point (pH) |
|---|---|---|
| 100 | 11.65 | 6.95 |
| 140 | 11.50 | 5.90 |
| 180 | 11.10 | 5.60 |

EXAMPLE 5

Following the procedure of Example 4 the phenolic hydroxyl group of alkali lignin was blocked with 1, 2 and 4 moles [per 1000 grams of lignin] respectively with chloromethane phosphonate. The results were:

| Reaction time (Min.) | pH after reaction | Precipitation point (pH) |
|---|---|---|
| 1 mole: | | |
| 0 | 11.40 | 6.60 |
| 5 | 11.80 | 3.00 |
| 15 | 11.50 | 2.60 |
| 60 | 11.60 | 2.60 |
| 120 | 11.50 | 2.55 |
| 2 moles: | | |
| 0 | 11.35 | 6.75 |
| 5 | 11.35 | 2.50 |
| 15 | 10.85 | 1.90 |
| 60 | 10.65 | 1.80 |
| 120 | 10.65 | 1.80 |
| 4 moles: | | |
| 0 | 11.45 | 6.30 |
| 5 | 10.95 | 1.65 |
| 15 | 10.85 | 1.35 |
| 60 | 10.75 | 1.30 |
| 120 | 10.20 | 0.95 |

EXAMPLE 6

A number of sulfonated lignins were treated with the blocking agents of this invention and tested as dye dispersants. The procedure was to add an aqueous solution of NaOH and blocking agent to a sulfonated lignin dissolved in water with stirring under a nitrogen atmosphere. After approximately 15 minutes of stirring the solutions were dried. The following materials were made for evaluation.

| Sample number | Blocking additive | Moles of add./1,000 grams lignin | Moles NaOH/1,000 grams lignin | Starting material |
|---|---|---|---|---|
| 1 | $ClCH_2SO_3Na$ | 1 | None | ReaxTM 80A. |
| 2 | Same as above | 1.5 | 1.5 | Do. |
| 3 | do | 3 | 3 | Do. |
| 4 | do | 6 | 6 | Do. |
| 5 | do | 10 | 10 | Do. |
| 6 | do | 10 | 10 | PolyfonTM O.[1] |
| 7 | $ClCH_2PO_3Na_2$ | 1 | None | ReaxTM 80 A. |
| 8 | Same as above | 1.5 | 1.5 | Do. |
| 9 | do | 3 | 3 | Do. |
| 10 | do | 6 | 6 | Do. |
| 11 | do | 10 | 10 | Do. |
| 12 | $ClCH_2CH_2OH$ | 6 | [2] | PolyfonTM O. |

[1] Sulfonated kraft lignin from Westvaco Corporation.
[2] pH maintained at 10.5–11.5 with NaOH.

Each of these products were evaluated as dye dispersants in the following solution.

A standard diazo disperse dye solution was prepared by mixing 5 grams of C.I. 21000 (Disperse Brown 1) in one liter of distilled water. The blocked lignin adducts having varying moles of reactant (from 1 mole to 10 moles) were added to the standard dye solution and the dispersing ability, fiber staining, foaming and diazo dye reduction properties measured. The results are shown in the table below.

The test for determining the extent of fiber staining caused by lignin based surfactants was to weigh out 10 grams of the lignin based surfactant and dissolve in 300 ml. of tap water. Adjust the pH to 9.0 with acetic acid.

Add a 5 gram nylon fiber skein and heat to a boil. Boil the mixture for 15 minutes, wash the skein with tap water and dry in an oven at 105° C.

The test for determining foaming properties of disperse dye surfactants was to weight out 1 gram of surfactant and dissolve in 100 ml. of tap water. Adjust to pH 9.5 with acetic acid and pour into a 250 ml. graduated cylinder. Rapidly invert 5 times and measure the height of the foam in ml. immediately after completing the inversions and again after 1 minute and 2 minutes have elapsed. If the foam disappears within 2 minutes note the time at which all the foam vanished. Return the solution after all the foam has broken (or 2 min.) and lower the pH to 7.0 with acetic acid and again perform the inversion and recording part of the test.

The diazo-dye reduction test was preformed by charging a pressure bomb with 500 mg. of C.I. Disperse Brown 1 dye, 200 cc. water, and 20 grams of sulfonated lignin dispersant. The mixture was thoroughly stirred and the pH adjusted to between 5 and 6 with acetic acid. A 10 gram nylon skein was placed in the dye mixture, the bomb sealed and heated to 130° C. for one hour. After cooling, the skein was removed from the bomb, washed and dried. The reduction in color was compared by visual observation, but may, if desired be determined by analysis of the residual solution with a spectrometer.

3. The product of claim 1 wherein said lignin is reacted with from 2 to 10 moles of said blocking agent.

4. Lignin adducts comprising the reaction product of a lignin and from 1 to 20 mole per 1000 grams of said lignin of a blocking agent from the group consisting essentially of 2-chloroethanol, 2-bromoethanol and acrolin, to obtain lignin adducts having blocked hydroxyl groups.

5. The product of claim 4 wherein said lignin is an alkali lignin reacted with from 2 to 10 moles of said blocking agent.

6. The product of claim 4 wherein said lignin is reacted with from 2 to 10 moles of said blocking agent.

7. Lignin adducts comprising the reaction product of a sulfonated lignin and up to 20 moles per 1000 grams of said lignin of the sodium salt of a blocking agent from the group consisting essentially of chloromethane sulfonate, chloromethane phosphate, 3-chloro-2-hydroxy propane phosphonate, and 1-chloro-2-hydroxyethane phosphonate, to obtain lignin adducts having blocked hydroxyl groups.

8. The product of claim 7 wherein said sulfonated lignin is reacted with from 1 to 10 moles of said blocking agent.

9. Lignin adducts comprising the reaction product of a sulfonated lignin and up to 20 moles per 1000 grams of said lignin of a blocking agent from the group consisting essentially of 2-chloroethanol, 2-bromoethanol and acro-

| Run | Moles reactant/ 1,000 gms. l'ignin | Diazo dye [1] reduction | Fiber [2] staining | Foam test,[3] ml. of foam | | | | |
|---|---|---|---|---|---|---|---|---|
| | | | | pH 7.0 | | | pH 9.5 | |
| | | | | Init. | 1 min. | 2 min. | Init. | 1 min. |
| 1 | 1 | 5 | 5 | 45 | 10 | 8 | 20 | (5) |
| 2 | 1.5 | 4 | 4 | 70 | 5 | (50) | 15 | (3) |
| 3 | 3 | 3 | 3 | 25 | (13) | | 15 | (3) |
| 4 | 6 | 2 | 1 | 15 | (55) | | 15 | (5) |
| 5 | 10 | 1 | 1 | 30 | (56) | | 15 | (5) |
| 6 | 10 | 3 | 1 | 30 | (35) | | 10 | (3) |
| 7 | 1 | | | 5 | 45 | 6 | 4 | 45 | (19) |
| 8 | 1.5 | | | 4 | 50 | 7 | 4 | 50 | 10 |
| 9 | 3 | | | 3 | 35 | 5 | (28) | 40 | 25 |
| 10 | 6 | | | 1-2 | 40 | 4 | (50) | 40 | 30 |
| 11 | 10 | | | 1 | 30 | (8) | | 50 | 32 |
| 12 | 6 | 2 | 2 | 30 | (14) | | | |

NOTES:
1. 1=Little or no diazo dye reduction, 5=severe diazo dye reduction.
2. 1=Little or no fiber staining, 5=severe fiber staining.
3. Numbers in parenthesis represent seconds required for the foam to break.

In all cases the fiber staining and diazo dye reducing tendencies improved when compared with the conventional sulfonated lignin dispersant of Run #1. Furthermore, good dispersant properties were retained and foaming decreased significantly.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:
1. Lignin adducts comprising the reaction product of a lignin and from 1 to 20 moles per 1000 grams of said lignin of the sodium salt of a blocking agent from the group consisting essentially of chloromethane sulfonate, chloromethane phosphate, and 3-chloro-2-hydroxy-propane phosphonate, to obtain lignin adducts having blocked hydroxyl groups.

2. The product of claim 1 wherein said lignin is an alkali lignin reacted with from 2 to 10 moles of said blocking agent.

lin, to obtain lignin adducts having blocked hydroxyl groups.

10. The product of claim 9 wherein said sulfonated lignin is reacted with from 1 to 10 moles of said blocking agent.

References Cited
UNITED STATES PATENTS

| 3,149,085 | 9/1964 | Ball et al. | 260—124 R |
| 2,837,563 | 6/1958 | Alles | 260—124 R |

FOREIGN PATENTS

| 181,108 | 9/1966 | U.S.S.R. | 260—124 R |

OTHER REFERENCES

Brauns: The Chemistry of Lignin, p. 303.

ELBERT L. ROBERTS, Primary Examiner

D. R. PHILLIPS, Assistant Examiner

U.S. Cl. X.R.
210—52; 8—86

UNITED STATES PATENT OFFICE
CERTIFICATE OF CORRECTION

PATENT NO. : 3,763,139
DATED : October 2, 1973
INVENTOR(S) : Sten I. Falkehag

It is certified that error appears in the above-identified patent and that said Letters Patent are hereby corrected as shown below:

Column 7, line 61 in claim 1, "chloromethane phosphate" should read --chloromethane phosphonate--.

Column 7, line 62 in claim 1, "phosphate" should read --phosphonate--.

Column 8, line 17 in claim 7, "phosphate" should read --phosphonate--.

Signed and Sealed this twenty-fifth Day of May 1976

[SEAL]

Attest:

RUTH C. MASON
Attesting Officer

C. MARSHALL DANN
Commissioner of Patents and Trademarks